Nov. 25, 1941.   D. M. DOW ET AL   2,263,762
VACUUM CLEANER
Filed Feb. 15, 1939   2 Sheets-Sheet 1
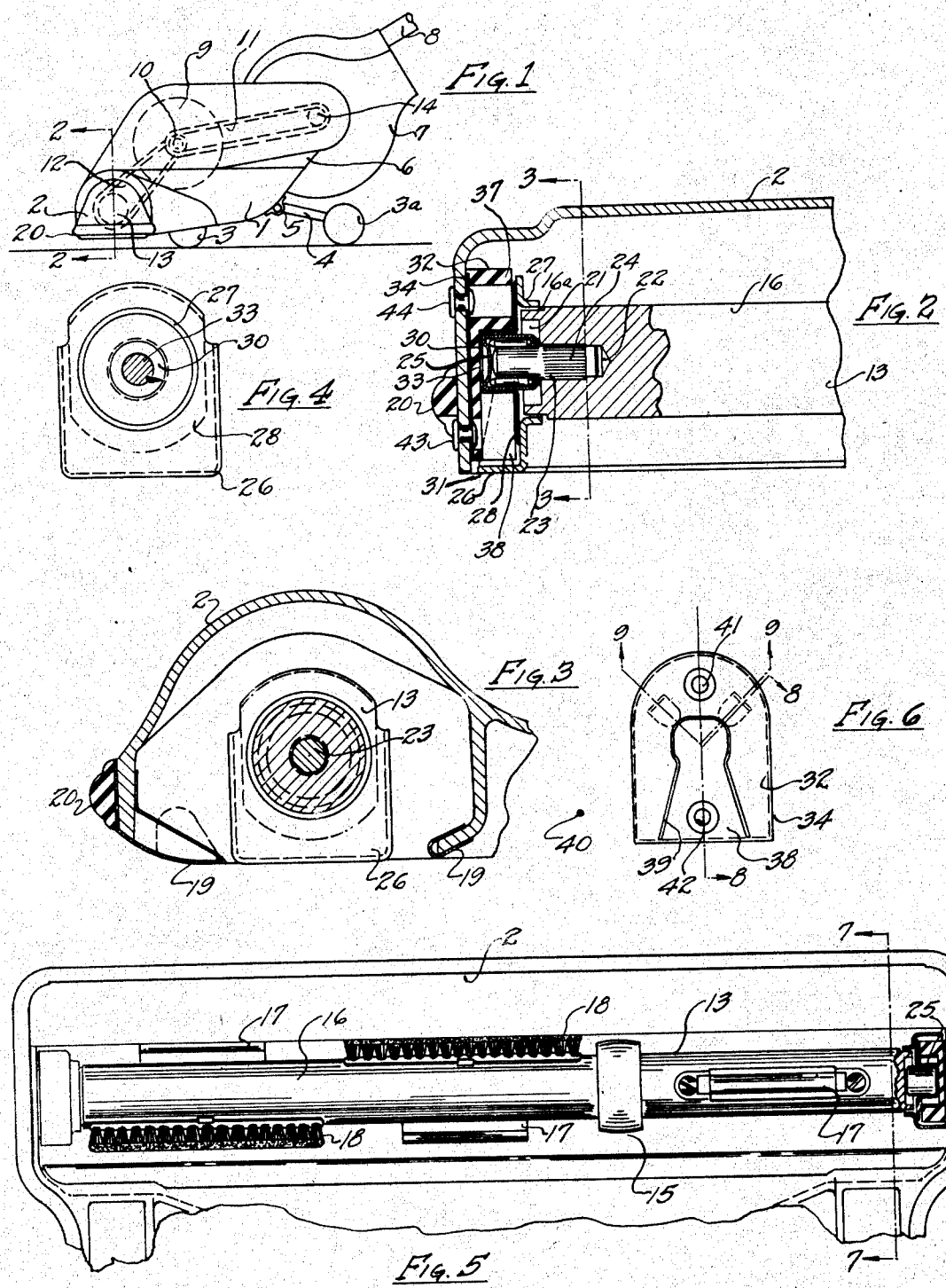
INVENTOR
DEWEY M. DOW
DONALD L. BOYD
FREDERICK H. BURMEISTER
BY
Alfred F. Dees
ATTORNEY Nov. 25, 1941.    D. M. DOW ET AL    2,263,762

VACUUM CLEANER

Filed Feb. 15, 1939    2 Sheets-Sheet 2

INVENTOR
DEWEY M. DOW
DONALD L. BOYD
BY FREDERICK H. BURMEISTER

ATTORNEY

Patented Nov. 25, 1941

2,263,762

UNITED STATES PATENT OFFICE 2,263,762

VACUUM CLEANER

Dewey M. Dow, Donald L. Boyd, and Frederick H. Burmeister, Toledo, Ohio, assignors to Air-Way Electric Appliance Corporation, Toledo, Ohio, a corporation of Delaware Application February 15, 1939, Serial No. 256,492

13 Claims. (Cl. 15—6)

This invention concerns vacuum cleaners and more particularly relates to a means and mechanism for mounting the agitator spindle in the nozzle of the cleaner for absorbing the vibrations and the noise generated in and by the spindle.

The object of this invention is to provide a vibration and sound absorbing agitator spindle mounting for a vacuum cleaner.

Another object of this invention is to provide a semi-rigid, substantially non-yielding, in a vertical direction, mounting for an agitator spindle that is particularly adapted to absorb the audible and inaudible vibrations generated by the rotatable agitator spindle.

A further object of the invention is to arrange a rubber element in an agitator spindle mounting that will absorb vibrations generated in and by a spindle but will not vertically yield when strains are applied to the spindle.

A still further object of the invention is to provide a mounting for a rotatable agitator that will limit or absorb the relative lateral movements of the agitator and the nozzle of the cleaner and will prevent relative vertical movements of the agitator and nozzle.

Further objects of the invention will appear as the description of the invention proceeds and any and all variations, alterations and modifications of the invention are intended to be included within the spirit and scope of the invention and it is limited only as defined in the appended claims. The manner in which the invention finds its most practical embodiments is set forth in the description following and the appended drawings in which:

Fig. 1 shows an elevational view of a portable vacuum cleaner in which are shown the prime mover and transmission for the rotating elements of the cleaner.

Fig. 2 is partial section view along the line 2—2 of Fig. 1.

Fig. 3 is an elevational section view showing the agitator spindle assembled in the end of the nozzle and taken substantially along the line 3—3 of Fig. 2.

Fig. 4 is an elevational view of the bearing holder or retainer for the agitator spindle.

Fig. 5 is a bottom view of the nozzle of the vacuum cleaner showing the agitator assembled therein with parts in section to illustrate the relationship thereof.

Fig. 6 is an elevational view of a preferred form of the vibration insulator.

Fig. 7 is a sectional elevational view of the agitator assembled in the nozzle mouth and showing it mounted in the vibration absorbing device.

Fig. 8 is a section view along the line 8—8 of Fig. 6.

Fig. 9 is a section view along the line 9—9 of Fig. 6.

Fig. 10 is a perspective view of one of the elements of the vibration absorbing device.

Fig. 11 is a perspective view of another element of the vibration absorbing device.

Fig. 12 is an elevational view of a modification of the vibration absorbing device.

Fig. 13 is a section view along the line 13—13 of Fig. 12.

Fig. 14 is an elevational view of another from of the vibration absorbing device shown in Figs. 12 and 13.

Fig. 15 is a section view taken along the line 15—15 of Fig. 14.

Fig. 16 is an elevational view of another modification of the invention.

Fig. 17 is a section view along the line 17—17 of Fig. 16.

Fig. 18 is an elevational view of still another form of the device shown in Figs. 16 and 17.

Fig. 19 is a section view along the line 19—19 of Fig. 18.

Fig. 20 is an elevational view of still another modification of the invention.

Fig. 21 is a section view along the line 21—21 of Fig. 20.

Fig. 22 is a partial elevational view of another form of the device shown in Figs. 16 and 17.

Fig. 23 is a section view along the line 23—23 of Fig. 22.

Fig. 24 is an elevational view of still another form of the device shown in Figs. 16 and 17.

Fig. 25 is a section view along the line 25—25 of Fig. 24.

This invention relates to subject matter constituting an improvement over devices described in application S. N. 92,712, filed July 27, 1936.

It was pointed out above in the statements of the objects of the invention that the provision of a vertical non-yielding mounting for the agitator of a vacuum cleaner spindle was desirable and that it should be provided with means to absorb vibrations and relative lateral movements of the agitator and the nozzle of the cleaner, generated in the agitator spindle by the beaters and brushes contacting the carpet or rug surface. Those vibrations or movements become objectionable when they are transmitted to the handle of the cleaner. The instant invention therefore looks to means and mechanism for localizing the audible and inaudible vibrations generated by the beaters and brushes of the agitator and confining them to the agitator spindle structure and the interior of the nozzle and preventing or prohibiting the spindle yielding in a vertical direction in such means and mechanism. The purpose of prohibiting the vertical yielding of the spindle is to maintain a fixed relationship between the lips of the nozzle and the brushes and beaters and to prevent a complete sealing of the lips of the nozzle on the rug surface being cleaned, thus providing a constant flow of air across the surface of the rug under the lips and thereby increasing the cleaning efficiency of the cleaner.

The accomplishment of the foregoing is embodied generally in a cleaner construction illustrated in Fig. 1 which discloses a more or less conventional organization and including the invention, in which 1 indicates a floor tool casing to which a nozzle 2 is integrally related. The floor tool is supported upon a pair of forward wheels 3, one only of which is shown, and by a pair of rear wheels 3a, one only of which is shown, the latter of which is supported for vertical adjustment on a bracket 4 pivotally secured to the casing by a bearing and pin construction generally indicated at 5 and as more particularly described and set forth in U. S. Patent No. 2,114,630, issued April 19, 1938.

Pivotally supported on a suitable pair of trunnions 6, one only of which is shown, is a fan case 7 to which a handle 8, only partially shown, is secured. Conveniently mounted on the upper surface of the floor tool casing 1 is a motor equipped with pulleys 10, around which power transmitting means 11 and 12 extend that drive the agitator 13 rotatably mounted in the nozzle 2 of the cleaner and to a fan (not shown) rotatably supported in the fan case 7. A pulley 15 is arranged on the agitator 13 and there is an appropriate pulley (not shown) arranged on the shaft 14, which rotatably supports the fan described above. The power transmitting means 11 and 12 extend around the pulleys 10, 15, and the fan shaft pulley, (not shown) whereby power is transmitted from motor 9 to the driven rotatable elements.

The agitator 13 consists of an elongated element 16 to which the pulley 15, previously described, is integrally secured. Arranged about the periphery of the spindle 16 are a plurality of brushing and beater elements 17, 17, 17 and 18, 18, 18, arranged in a spiral fashion, the former of which are more specifically described in U. S. Patents No. 2,064,852 and No. 2,064,856. The spiral arrangement of the brushes and beaters about the periphery of the agitator spindle in combination with vibration absorbing support 32, herein described, maintains a better dynamic balance of the spindle and reduces to a minimum the vibrations normally generated in the rotating spindle by reason of the brushes and beaters contacting a surface being cleaned. The brush and beater elements are placed 120 degrees apart, as indicated by the beaters in Fig. 5, and a brush element is arranged diametrically opposite the right end beater as more particularly shown in Fig. 7. Attention is invited to that fact that for each section of the spindle a beater is mounted diametrically opposite a brush, and that each brush and beater is displaced 120 degrees from the brush and beater in the succeeding portion of the agitator. Since there are three sets of brushes and beaters, it is obvious that a complete spiral arrangement about the periphery of the spindle 13 is provided by the brushes and beaters.

The agitator is mounted for rotation in the nozzle 2, in such a position that the brushes 18, 18, 18 and beaters 17, 17, 17 when in their lowermost position extend to substantially a plane across the lips 19—19 of the nozzle or slightly above that plane. A convenient bumper 20 is arranged about the periphery of the nozzle to prevent injury to the nozzle and to any object the nozzle may contact when the cleaner is in use. The spindle 16 is counterbored as at 21 and 22, the smaller of which bores is adapted to receive a bearing pin 23 having a knurled portion 24 which is driven into the bore 22, the knurled portion 24 being provided for the purpose of preventing a relative rotation of the pin 23 and spindle 16.

Fitted on and held by the bearing pin 23, is an anti-friction bearing assembly 25 that extends in the bore 21. Fitted over the end of the spindle 16 is a bearing retainer 26. The end of the spindle is of slightly reduced diameter as indicated at 16a with which portion 27 of the bearing retainer 26 cooperates and which together function such as to prevent dust, etc., from getting into the bearing.

The bearing retainer 26 is shaped generally in section as indicated in Fig. 2 with the outer or left end wall being disposed diagonally as indicated by the dotted line. Secured to the bearing retainer 26 is a press metal element 28 dished as at 30, which dished portion actually holds the bearing assembly 25. The bearing retainer 26 is provided with a ledge or shoulder 31 which extends to proximity with the end wall of the nozzle 2, and fits over the opening or slot 38 of the vibration absorbing device 32. An opening 33 is provided in dished part 30 of retainer 26 to permit access to the interior of the dished part 30 and to permit a truer and closer fit of bearing 25 in the element 30.

It was stated above that one of the objects was to prevent a vertical yielding of the spindle in the mounting. The essential purpose of this is to maintain a steady, constant and unvarying application of the beaters and brushes of the agitator to the surface being cleaned for reasons and purposes previously discussed. The spindle must from time to time yield but this is confined to a lateral or a horizontal yielding, substantially in the direction of the arrows 29—29 indicated in Fig. 7. The means and mechanism for maintaining this relationship is in part accomplished by the construction of mounting 32 taken in connection with the dynamically balanced spindle and the method of assembling the mounting 32 in the nozzle.

Vibration absorbing mounting 32 comprises initially an appropriately shaped sheet metal backing element 34. This element is provided with a plurality of shoulder portions or abutments 35 and 36. The portions 35 and 36 are produced from the body of backing element 34, which has been appropriately sheared or cut and then bending the sheared or cut parts such that they extend at right angles to element 34 as illustrated. A rubber portion 37 is bonded to backing element 34 and into which rubber, parts or abutments 35 and 36 extend. The rubber portion 37 is appropriately shaped to fit backing element 34 and is provided with a slot 38 into which slot portion 30 of bearing retainer 28 slides vertically into operating position.

The slot 38 is equipped with a metallic liner 39, preferably of a fairly stiff spring steel. The reason for providing the liner of spring material in the slot is two fold. Where a spring alone is used, it will fatigue rapidly by reason of the vibration it must absorb. When this spring is backed up by rubber, its normal useful life will be increased because the shock of vibration absorption is largely taken up by the rubber and is not borne exclusively by the spring. Another function of the spring liner is that of preventing lubricant from reaching the rubber. Lubricant has a detrimental effect on rubber and if it is kept away from the rubber, the usefulness of life of the rubber will be increased. The effect therefore of the organization is two fold, viz. to increase the useful life of the spring and to increase the useful life of the rubber.

From an inspection of the drawings, it will be apparent that the agitator 16 is prevented from moving vertically an appreciable amount by reason of the portions or abutments 35 and 36, such movements or yield vertically of the agitator will be microscopic by reason of the small amount of rubber placed between liner 39 and abutments 35 and 36. The bearing holder 30 seats in the upper end of the liner beyond the contracted portion of the liner 39. There will, however, be motion laterally of the agitator 13 in mounting 32 substantially about point 40 as an axis but there will be no vertical yielding of the spindle. If undue strains require a vertical movement between the floor and agitator 13 relative to nozzle 2, such movement will be taken care of by the flexible beaters 17, 17, 17 and brushes 18, 18, 18 or by a vertical movement of the entire nozzle 2 and its associated mechanism, and not by any relative vertical movement of the agitator and its mounting. Attention is further invited to the fact that the agitator spindle bearing 25 and its retainer 26 has rubber placed on three sides of it as shown in Figs. 8 and 9 that will absorb vibrations generated in and by the spindle and prevent their transmission ultimately to the handle 8 of the cleaner.

Backing element 34 is appropriately apertured as at 41 and 42. These apertures correspond with another pair of similarly shaped and spaced openings in the end wall of nozzle 2, through which rivets 43 and 44, or other appropriate securing means are passed and which are headed over onto backing element 34, to securely fasten the vibration absorbing mounting 32 in position on the end wall of nozzle 2.

From the foregoing it is apparent that spindle 16 may swing in the direction of arrows 29—29, but is prohibited from moving vertically by reason of the parts or abutments 35 and 36. By use of the spirally arranged beater and brush elements on the agitator, which afford a greater degree of dynamic balance in cooperation with the mounting adapted to permit a lateral movement about point 40, or an axis about the point 40, all vibrations generated in the spindle by reason of the brushes and beaters contacting the carpet or rug surface will be taken up by the mounting and prevented from being transmitted to the handle of the machine. The combined effect of the spiral brush and beater arrangement on the agitator 13 and the mounting 32 produce the foregoing result.

Figs. 12 and 13 disclose one modification of the invention in which a backing plate 45 similarly shaped to plate 34 is provided. The plate has a pair of apertures 46 and 47 which are adapted to receive rivets to secure the plate to the end wall of the cleaner nozzle. A rubber element 48 shown in dotted lines is bonded to backing plate 45 and functions similarly to rubber element 37. An opening, or slot 49, is provided in the rubber element into which a bearing retainer similar to 26 and 30 is adapted to slide vertically to operating position. A liner 50 of a substantial spring-like material is arranged within the opening 49 which is contracted near its upper end beyond which contraction the portion 30 of the spindle bearing retainer is firmly seated.

Backing element 45 is provided with a slot 51 which is centrally disposed of the backing element and is arranged to receive a tongue member 52 integral with liner 50. The tongue member 52 is disposed at the upper part of the liner and after insertion in slot 51 it may be headed or otherwise secured therein but with provision for a limited amount of lateral movement. Since backing element 45 and liner 50 are fabricated from a substantially heavy stock, vertical upward movement of a spindle rotatably mounted in the device is prevented. The spindle may, however, yield laterally a small amount because of the rubber element which absorbs, in its yielding, the vibrations generated in and by the agitator spindle.

Figs. 14 and 15 show another form of the modification of Figs. 12 and 13 in which the mounting element initially comprises an appropriately shaped backing plate 53. The plate has two apertures 54 and 55 in it through which rivets or other securing means are adapted to pass to assemble the plate onto the end wall of the nozzle. A rubber element 56 shown in dotted lines is bonded to the plate 53 for the purpose of absorbing vibrations which are generated by the beaters and brushes of the agitator spindle rotatably supported in the vibration absorbing device. A slot or opening 57 is arranged in the rubber element in which a spindle bearing retainer similar to 26 and 30 is adapted to slide vertically to operating position. The slot 57 has a liner 58 which is preferably of spring-like material, which liner is slightly contracted near its upper end beyond which contraction a bearing retainer similar to 26 and 30 is firmly clamped and held in operating position. Backing element 53 has a portion 59 bent upward and which extends at right angles to the main body of backing element 53. The portion 59 overlays the liner 58 and since backing element 59 is of fairly substantial and heavy material all vertical movement of the spindle rotatably held in slot 57 and liner 58 is prohibited. Liner 58 may freely move laterally relative to the backing element 53, and portion 59 in which movement the rubber portion 56 absorbs the vibrations generated in and by the spindle.

Figs. 16 and 17 show a further modification of the vibration absorbing device. A backing plate 60 is provided which is equipped with apertures 61 and 62 through which rivets or other securing means are adapted to pass whereby the element may be assembled onto the end wall of the cleaner. A rubber element 63 shown in dotted outline is bonded to the backing plate 60 and is adapted to absorb the vibrations generated in and by the spindle. The rubber element is provided with a slot 64 in which a bearing retainer is adapted to slide vertically to operating position. The slot is provided with a liner 65, which is contracted near its upper end and beyond which contraction a bearing retainer similar to 26 and 30 is firmly clamped to hold the agitator in position. The backing element 60 is provided with two similar narrow slots 66 and 67 substantially as shown. Liner 65 is provided with a pair of integral tongue elements 68 and 69, near the lower or free ends of the liner. The tongues 68 and 69 are inserted in the slots 66 and 67 and headed onto the backing plate or otherwise appropriately, firmly and immovably secured in the backing plate.

The agitator spindle mounted in the vibration absorption element is by reason of the structure prevented from moving upwardly or vertically relative to the mounting but is permitted to swing laterally on an axis substantially midway between tongues 68 and 69 and on a line drawn through the two tongue elements. The lateral motion of the spindle is absorbed by the rubber element and said motions or vibrations are thereby prohibited from passing ultimately to the handle of the cleaner.

Another form of the modification of Figs. 16 and 17 is set forth in Figs. 18 and 19, in which a suitable backing plate 70 is provided having two apertures 71 and 72 through which rivets or other suitable securing means may be passed whereby the plate is assembled onto the end wall of a cleaner nozzle. A rubber portion 73 shown in dotted lines is bonded to the plate 70 and is adapted to absorb vibrations generated in and by the spindle. The rubber element 73 is provided with a slot 74 in which an appropriate agitator bearing spindle retainer is adapted to move vertically to operating position. The slot 74 is provided with a liner 75 preferably of a substantial spring-like material and is bonded to the rubber element 73.

Backing plate 70 has two portions 76 and 77 bent at right angles to itself and as shown are a part of the backing plate 70 bent as indicated. Liner 75 has foot elements 78 and 79 bent relative to the two legs of liner 75 and are adapted to engage beneath the portions 76 and 77 of the backing plate. This arrangement prevents the spindle bearing retainer firmly held in position beyond or above the contracted portion of the liner 75 from moving or yielding vertically relative to the nozzle and vibration absorbing mounting. The spindle may, however, swing or move laterally in a manner suggested and described in connection with Figs. 16 and 17, by which motion the rubber part is permitted to absorb the vibrations generated in and by the agitator and prevent their transmission to the handle of the vacuum cleaner.

Figs. 20 and 21 show another modification of the invention in which a suitable backing plate 80 is provided having two apertures 81 and 82 therein through which rivets or other securing means are adapted to pass for the purpose of securing the plate to the end wall of a cleaner nozzle. The plate has bonded to it a rubber element 83 having projections or parts 84 and 85 extending outwardly from the main body 83 and providing for slot or groove 86 in which a spindle bearing retainer may slide vertically to operating position.

The slot or groove 86 is equipped with a two part liner 87 and 88 which is contracted slightly at its upper end and adapted to assist in securely seating a spindle bearing retainer in the vibration absorbing device. The liner elements are bonded to the rubber parts 84 and 85 to hold them in position.

In order to prohibit a relative vertical movement of a spindle held in the mounting relative to the mounting, part 89 is provided, which is arranged in the slot 86, and by reason of the right angled construction of the part, one leg thereof is welded or otherwise appropriately secured to the backing plate 80.

The spindle bearing retainer bears directly against part 89 and prohibits the vertical movement but permits the spindle to swing laterally, which lateral movement caused by the vibrations generated in and by the spindle is absorbed by the rubber element 83 and its component parts 84 and 85 and prevents their transmission to the handle of the machine. Attention is invited to the fact that slot 86 extends all the way up and down the vibration absorbing element.

Figs. 22–25 disclose two variations of the modifications of Figs. 16–21 of the modes of attaching the lower extremities of the spring insert into the backing plate. In Figs. 22 and 23 a fragmentary portion of backing plate 90 and a vibration absorption rubber element 91 is shown. A portion of the spring-like liner 94 is also shown. A holding element for the lower extremity of the liner is shown in the form of a rod which extends through an appropriate aperture in backing plate and is headed as at 92 to retain it in place on the backing element. The lower extremity of the liner 94 is bent to circular form as shown and snugly fits about the rod element 93.

The form shown in Figs. 24 and 25 discloses a fragmentary portion of a backing plate 95 and rubber element 97 which has a liner 98 provided in the accustomed groove adapted to receive a bearing retainer. The backing plate has a rigid bracket 96 welded or otherwise secured to it for the purpose of holding one of the lower extremities of the liner 98. The lower end of the leg of the liner is bent such that it may rest upon the bracket 96. Each of the positioned portions are appropriately apertured to receive a rivet 99 or other holding means whereby the parts are joined together. It should be apparent that when the agitator spindle rests against the upper end of the liner so mounted that any relative vertical movement thereof will be prevented but that lateral motion can be imparted which will be absorbed by the rubber element.

The above is considered to so fully reveal the gist of the invention that any one can by studying the principles thereof reproduce same in any desired application. That which is regarded as new, novel and useful and which it is sought to protect by Letters Patent of the United States is as follows:

1. In a vibration absorbing bearing mounting, a backing plate, a rubber element bonded to said plate, said rubber element having a slot in one of the faces in which a bearing is adapted to slide vertically to operating position, a spring steel liner for said slot, means on said backing plate adapted to prevent vertical movement of said liner relative to said backing plate, and means to retain the bearing in operating position in said mounting.

2. In a vibration absorbing bearing mounting adapted for use in the nozzle of a vacuum cleaner, a backing plate adapted to be rigidly secured to the end walls of the nozzle, a rubber element bonded to said backing plate, said rubber element having a slot formed in one of its walls and adapted to receive a bearing, a liner for said slot, means supported in said backing plate and cooperating with the liner adapted to prevent relative vertical movement of said bearing and mounting and means on said liner adapted to maintain said bearing in operating position.

3. In a vibration absorbing bearing mounting, a backing plate, a rubber element secured to the backing plate, said rubber element having a slot in which a bearing is adapted to slide vertically to operating position, a metallic lining means for said slot, means on said liner whereby said bearing is maintained in operating position and means on said mounting whereby relative vertical movement of said liner and said backing plate is prevented, but which permits a relative lateral vibrational movement of said liner and said rubber element, said rubber element absorbing the said lateral vibrational movement.

4. In a vibration absorbing bearing support adapted for use in the end walls of a vacuum cleaner nozzle, a backing plate, a rubber element secured to said backing plate, rigid means extending at right angles to said backing plate and secured to said plate, said rubber element having a slot in one of its faces and having a portion at its upper end adapted to seat a bearing, a liner for said slot, said liner and said rigid means cooperating to prevent a vertical movement relative to each other and means on said liner adapted to seat said bearing in the upper end of said slot and liner.

5. In a vibration absorbing support for the bearing of a rotatable agitator of a vacuum cleaner, a backing plate, a rubber means supported on said backing plate, said rubber means having a slot in which a bearing is adapted to slide to operating position, a spring-like liner for said slot, rigid means on said backing plate and extending at right angles to said plate, means on the ends of said liner engaging said rigid means, said last mentioned means cooperating to prevent relative vertical movement of said liner and backing plate.

6. In a vibration absorbing device for supporting an agitator bearing adapted for use in the nozzle of a vacuum cleaner, the combination, a backing plate, rubber means permanently secured to the backing plate, said rubber means having a slot in which said bearing is adapted to slide to operating position, a liner for said slot, means on said liner adapted to retain said bearing in operating position, means extending at right angles to the backing plate, said means being disposed in proximity of the upper end of said slot and liner, said means cooperating with said liner to prevent a relative vertical motion of said liner and backing plate, but permitting a relative lateral vibrational movement of said backing plate and liner.

7. In a vacuum cleaner having a nozzle and an agitator rotatably mounted in said nozzle, means to maintain a fixed vertical positioning of said agitator relative to the mouth of the nozzle, said means comprising vibration absorbing mountings mounted on the end walls of the nozzle in which said agitator is rotatably mounted and which includes a backing plate, a rubber element secured to the plate, said rubber element having a slot in one of its faces in which a bearing for said rotatably mounted agitator is disposed, a liner for said slot, means associated with said mounting to prevent a relative vertical movement of the agitator and said mounting, whereby said fixed vertical relation of said agitator and said nozzle mouth is maintained.

8. In a vibration absorbing mounting for the bearing of a rotatable agitator arranged in the nozzle of a vacuum cleaner, the combination, a rigid metallic backing plate, a rubber element secured thereto, said rubber element having a slot in one of its faces in which said bearing is adapted to slide to operating position, a liner for said slot, said liner and said rubber element complementing each other whereby said rubber element reduces liner fatigue, and said liner prevents bearing lubricant from contacting said rubber element.

9. In a vibration absorbing support for the bearings of a rotatable agitator for the nozzle of a vacuum cleaner, a plate adapted to be mounted on the end walls of the nozzle, a resilient element secured to said plate, said resilient element having means in which to seat said bearings, a liner for said means, means to prevent a relative vertical movement of said agitator and said support, said last mentioned means being disposed in close proximity to said liner, but out of direct contact with same, and said means to prevent said relative vertical movement being embedded in said resilient element.

10. In a vibration absorbing mounting for the bearings of a rotatably mounted agitator disposed in the nozzle of a vacuum cleaner, the combination, a plate element adapted to be secured to the end walls of the nozzle, a resilient element secured to the plate and having a slot in which said bearings seat, a liner for said slot, said plate having slots cut therein, tongue elements on said liner extending into said slot, said tongue elements preventing relative vertical movement of said agitator and mounting but permitting relative lateral movement of said agitator and mounting.

11. In a vacuum cleaner agitator bearing mounting, a backing plate means, a rubber element supported on said plate, said rubber element provided with means to receive and retain an agitator bearing and means on said backing plate adapted to prevent relative vertical movement of said bearing and said backing plate.

12. In a vacuum cleaner having a nozzle and an agitator therein, vibration absorbing means mounting said agitator in said nozzle, said mounting means comprising a backing plate, a cushion of vibration absorbent material bonded to said plate, a liner element mounted in said cushion and adapted to receive an end member of said agitator, and means connecting said liner to said backing plate in a manner to prevent vertical movement while permitting horizontal movement of the liner relative to the plate.

13. In a vacuum cleaner having a nozzle and an agitator therein, vibration absorbing means mounting said agitator in said nozzle, said mounting means comprising a cushion of vibration absorbent material secured in an end of the nozzle, a liner of material of greater rigidity than said cushion, mounted in the cushion and receiving an end member of the agitator, and means connecting said liner to the nozzle in a manner to prevent vertical movement of the agitator relative to the nozzle while freely permitting horizontal movement within the limits imposed by said cushion, the cushion serving to prevent the transmission of vibrations from the agitator to the nozzle.

DEWEY M. DOW.
DONALD L. BOYD.
FREDERICK H. BURMEISTER.